(No Model.)
H. B. SHERMAN.
PIPE COUPLING.
No. 601,591.  Patented Mar. 29, 1898.
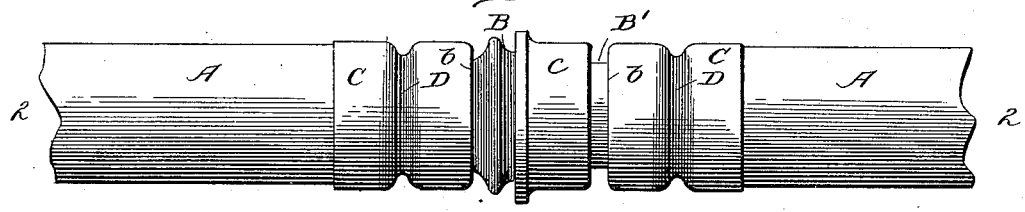
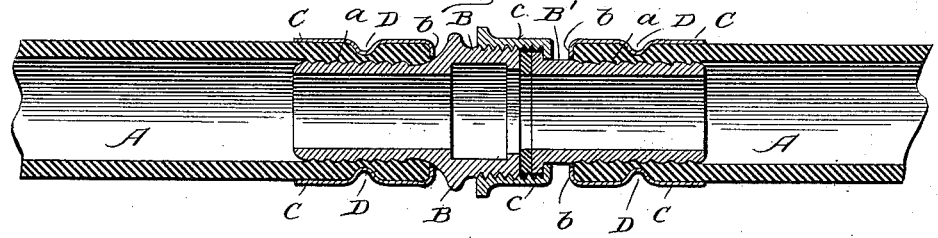
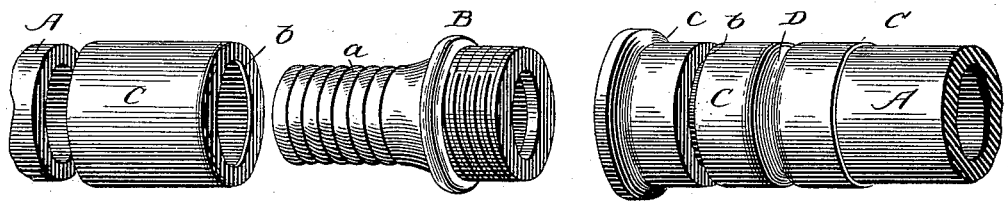
WITNESSES:
Edwin L. Bradford
INVENTOR
H. B. Sherman,
BY
ATTORNEY

United States Patent Office.

HOWARD B. SHERMAN, OF BATTLE CREEK, MICHIGAN, ASSIGNOR TO THE H. B. SHERMAN MANUFACTURING COMPANY, OF SAME PLACE.

PIPE-COUPLING.

SPECIFICATION forming part of Letters Patent No. 601,591, dated March 29, 1898.

Application filed July 3, 1897. Serial No. 643,372. (No model.)

*To all whom it may concern:*

Be it known that I, HOWARD B. SHERMAN, a citizen of the United States, residing at Battle Creek, in the county of Calhoun and State of Michigan, have invented certain new and useful Improvements in Pipe-Couplings; and I do hereby declare the following to be a full, clear, and exact description of the invention, such as will enable others skilled in the art to which it appertains to make and use the same.

My invention relates to pipe-couplings in general, but is especially designed, arranged, and adapted for use in connection with the ordinary flexible garden-hose of commerce, being thus employed to neatly and effectively unite the adjacent sections in a detachable manner or, in conjunction with a suitable interposed union, to permanently connect the same.

More particularly stated, the invention resides in a novel and most effecient means for securing hose-sections at their ends to the ordinary screw-coupling shank or a union; and it consists in an open-ended cylindrical shell or ferrule slightly shouldered at one extremity and surrounded by a peripheral crimp or corrugation which indents the surface of the flexible hose in a plane at right angles to its axis and firmly interlocks said ferrule, hose, and inclosed coupling member after they are assembled.

The object of my present invention therefore is the production of a simple, reliable, and durable coupling fully capable of withstanding great water or air pressure to which it may be subjected, a coupling applicable to hose of varying diameters and irregular end walls, one presenting a most compact and finished appearance, at the same time permitting a speedy and accurate adjustment of parts.

As a further object my invention contemplates the peculiar combination and arrangement of parts hereinafter more fully set forth, including in the shell or ferrule aforesaid a suitable closure or open-ended cap for the extremity of a hose-section, a true end bearing for the swiveled member of the coupling, as also the surrounding crimp for securing said shell, interlocking the within adjacent parts, and serving to pack the hose-section against leakage.

The invention will be hereinafter described, and particularly pointed out in the claims following.

In the accompanying drawings, which form part of this specification, and whereon corresponding letters of reference indicate same parts in the several views, Figure 1 represents in side elevation the adjacent ends of two hose-sections employing my improved form of coupling. Fig. 2 is a central longitudinal section taken on the line 2 2 of Fig. 1; and Fig. 3 is a detail view in perspective, illustrating the several parts of coacting coupling members detached, but in relative arrangement.

Reference being had to the drawings and letters thereon, A A indicate sections of flexible hose, and B B' coupling-shanks contained, respectively, within the adjacent ends of said hose-sections, there being firmly secured, while each of the shanks B and B' are configured by a series of transverse corrugations $a$, assisting to retain them within hose-sections A, as will later appear.

C C represent corresponding shells or ferrules whereby the ends of hose-sections A are finished and neatly inclosed, the inturned flange or edge $b$ of each shell flanking the extremity of its hose-section, thus insuring a true and regular end wall. By reference particularly to Fig. 1 it will be noted that each shell or ferrule C is indented and surrounded by a crimp or transverse corrugation D, applied after the parts of my improved coupling are assembled by the agency of a special tool invented by me for the purpose and forming the subject-matter of a separate application for Letters Patent filed simultaneously herewith.

Crimps D, embedded in the flexible surface of a hose-section A, force the latter with a marked degree of regularity and closeness of contact into one of the corrugations $a$ of shank B, whereupon said shank, hose, and ferrule are positively interlocked and retained against dislodgment without the aid of a separate hose-clamp, while at the same time an efficient packing against leakage is furnished by the flexible hose itself, the latter being in no wise cut or injured by pressure of the crimp D thus embedded.

Interposed between the coupling-shanks B and B' is located an ordinary internally-threaded coupling-ring c, swiveled upon the first-named shank and adapted to receive the externally-threaded end of coacting shank B' in the usual manner of coupling.

This being substantially the construction of my invention, its use and operation are too apparent to require explanation, particularly since the invention resides more especially in the assembling of parts heretofore set forth in combination and the peculiar advantages resulting from the employment of shells or ferrules C, with their characteristic features. It will be noted, however, that there is an important distinction between the crimps D and a similar corrugation spun in a sheet-metal shell or ferrule by aid of a rotary tool either before or after such ferrule has been applied to its hose-section. The crimps D as herein employed uniformly indent the surface of its hose-section throughout—in fact, compensating for any irregularities in the walls of the hose at point of crimping—and this by contacting means advancing simultaneously from all directions without the necessity of turning the hose-section operated upon and without causing its flexible body to pucker unevenly or the binding-ferrule to become distorted.

Having thus described my invention, what I claim, and desire to secure by Letters Patent, is—

1. In a hose-coupling the combination with a hose-section and internal coupling-shank, of an external shell or ferrule, and a transverse crimp deeply indented in the ferrule and hose-section above said shank after the parts are assembled, substantially as described.

2. In a hose-coupling the combination with a hose-section and internal coupling-shank, of an external shell or ferrule surrounded by a crimp indenting said ferrule in a plane at right angles to its axis, whereby said hose-section, shank and shell are firmly interlocked after the parts are assembled, substantially as described.

3. In a hose-coupling the combination with a hose-section and internal coupling-shank, of an external shell or ferrule surrounded by a single transverse continuous crimp indenting said ferrule in a plane at right angles to its axis, whereby the hose-section, shank and shell are firmly interlocked, substantially as described.

4. In a hose-coupling the combination with a hose-section and corrugated internal coupling-shank, of an external shell or ferrule finished by an inturned flange, and surrounded by a single transverse non-spiral crimp, whereby the hose-section, shank and shell are firmly interlocked, substantially as described.

In testimony whereof I subscribe my signature in presence of two witnesses.

HOWARD B. SHERMAN.

Witnesses:
WM. E. DYRE,
HUGH M. STERLING.